Dec. 31, 1957  J. P. MILLS  2,818,172
ELECTRO-OPTICAL MEASURING, TESTING OR GRADING APPARATUS
Filed June 12, 1953  7 Sheets-Sheet 1

Fig. 1.

Inventor
JOHN PENROSE MILLS
By Richards & Geier
Attorneys

Dec. 31, 1957  J. P. MILLS  2,818,172
ELECTRO-OPTICAL MEASURING, TESTING OR GRADING APPARATUS
Filed June 12, 1953  7 Sheets-Sheet 2

Fig. 1A.

Inventor
JOHN PENROSE MILLS
By Richard E. Geier
Attorneys

Dec. 31, 1957 J. P. MILLS 2,818,172
ELECTRO-OPTICAL MEASURING, TESTING OR GRADING APPARATUS
Filed June 12, 1953 7 Sheets-Sheet 3

Inventor
JOHN PENROSE MILLS
By Richard C. Geier
Attorneys

United States Patent Office 2,818,172
Patented Dec. 31, 1957

2,818,172

ELECTRO-OPTICAL MEASURING, TESTING OR GRADING APPARATUS

John Penrose Mills, Aston, Birmingham, England, assignor to British Timken Limited, Birmingham, England, a British company Application June 12, 1953, Serial No. 361,363

18 Claims. (Cl. 209—88)

This invention relates to electro-optical measuring testing, or grading apparatus for selectively bringing into operation a plurality of control or indicating devices in accordance with variations in physical displacement of a member responsive to variations in physical characteristics such as size or weight, or in physical conditions, such as temperature or pressure. The invention is of wide application. It may, for example, be applied to a machine for grading gudgeon-pins according to variations in diameter, pins of different diameter being directed by gates actuated by selectively-energized solenoids to different grading compartments. Or, as an example of the application of the invention to a different field, changes in temperature may be caused to turn a meter spindle, the apparatus being in this case arranged so that turning of the spindle by different amounts causes actuation of different solenoid-controlled recording pens or the like spaced across a moving recording tape or band, so that a record of temperature changes is obtained.

According to the invention, electro-optical measuring, testing, or grading apparatus, for selectively bringing into operation one of a plurality of control or indicating devices in accordance with variations in physical displacement of a member responsive to variations in physical characteristics or conditions, comprises means operable by such variations to cause a light beam to deflect in accordance with said variations, a continuously and cyclically movable scanning device for permitting the passage of the light beam to a photo-electric cell during each cycle, the beam being caused to fall on and excite the cell at different times for different amounts of beam deflection, and a continuously-movable switch device driven in synchronism with the scanning device and adapted during each cycle electrically to connect the photo-electric cell to each circuit of a plurality of electric circuits in turn, the said circuits respectively controlling separate electrically-actuated control or indicating devices, so that one or other of the said circuits is caused to be selectively energized according to the amount of beam deflection. The invention has the advantage that reaction or feed back from the control or indication devices to the means causing the deflection of the light beam is avoided; and the accuracy and sensitivity of the apparatus does not have to be restricted in any way to meet requirements of mechanical strength, or to enable mechanical power to be transmitted through the machine, as would be the case if the variations in physical displacement to which the apparatus responds operated control or indicating devices merely by mechanical coupling means.

The light beam is preferably deflected by an angularly movable mirror, which is responsive to the variations in physical displacement, on to a stationary mirror inside a hollow rotating cylindrical drum which has an opening at one end to receive the beam, the said drum constituting the movable scanning device and having a plurality of scanning slots or apertures in its annular wall, the beam from the stationary mirror passing through different slots or apertures for different deflections. The movable switch device which is driven in synchronism with the scanning member is preferably a rotatable contact arm or contact member adapted to engage each of a plurality of stationary contact studs or parts in turn, different contact studs or parts being connected to different circuits controlling the control or indicating devices.

The photo-electric cell may be connected to the rotary switch device through an amplifier, means being provided for negatively biasing a control grid of a valve of the amplifier to a voltage below the cut-off voltage for the valve, so that the amplifier will not transmit a light-induced voltage from the cell to the switch if the said voltage is generated by a beam the cross-sectional area of which, at a scanning slot or aperture, is less than a predetermined value, this feature being useful when it is desired to prevent the wrong control or indicating device from being actuated if the beam passes, at a particular steady deflection, through more than one scanning slot or aperature.

Each of the plurality of circuits connected in turn to the photo-electric cell by the switch device may operate a corresponding solenoid through a relay device when the said circuit is energized, the said relay device including a gas-filled triggering valve or thyratron which can be fired by a voltage pulse in the said circuit to initiate operation of the relay device. These solenoids may, if the invention is applied to a grading machine, operate suitable gates for directing articles to different grading stations; or the said solenoids may operate any other suitable devices, such as the hereinbefore-mentioned pens of a temperature-recording device.

Referring to Figures 1 to 6 of the drawings, apparatus for automatically grading gudgeon-pins, according to variations in their diameter, comprises an anvil 1 on to which each gudgeon-pin 2 is fed in turn by a feed bar 3 of an automatic feed mechanism. A sloping guide channel 4 for the pins leads from the anvil 1, and disposed beneath this guide channel 4 are twelve vertical discharge chutes 5 each communicating at the top with the guide channel 4 and each adapted to be closed by a gate 6 which normally lies more or less in the plane of the bottom of the guide channel 4, so as to close the respective chute 5, but which can be raised, as shown in the case of the gate 6 nearest the anvil 1, to open the respective chute 5 and to deflect a gudgeon-pin into the latter. The feed bar 3 is reciprocating, and on each forward stroke it moves a gudgeon-pin 2 on to the anvil 1, then pauses so that the said pin 2 is stationary on the anvil 1 for a short time, and finally moves forward again to propel the pin 2 into the guide channel 4, the pin 2 dropping into one or other of the chutes 5 according to which of the gates 6 is open. The chutes 5 direct the gudgeon-pins into suitable sorting canisters or compartments (not shown). Each gudgeon-pin 2, when it reaches its temporarily stationary position, is arranged to contact the lower end of a vertically-movable gauge plunger 7. This plunger 7 moves up or down in accordance with variation in the diameter of the gudgeon-pins which contact it and this vertical movement of the plunger is transmitted through a lever 8 to a pivoted plane mirror 9, which is moved angularly by the plunger 7 to a greater or less extent according to the magnitude of the diameter of the gudgeon-pin beneath the plunger 7.

Figure 1:
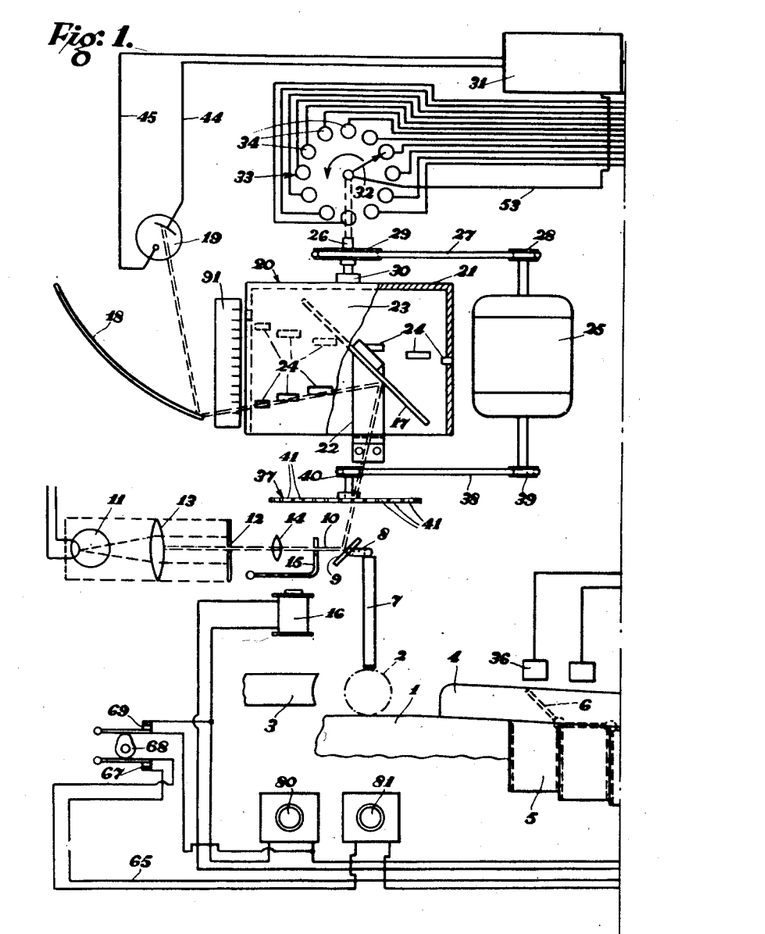
Figure 1 of the accompanying drawings is a diagrammatic view of apparatus for automatically grading gudgeon-pins, the said machine embodying an electro-optical arrangement which is in accordance with the present invention.
Figure 1A:
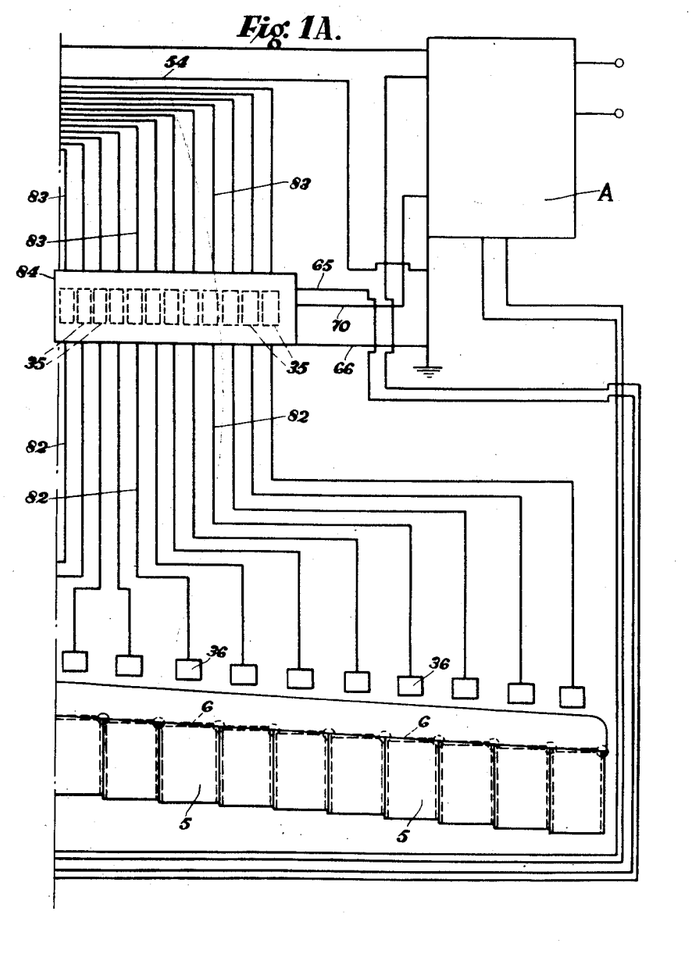
Figure 2:
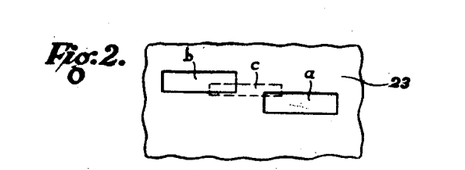
Figure 2 is a view of a small portion of a scanning device of the said apparatus, showing a position in which a light beam passes through two adjacent scanning slots.

The said pivoted mirror 9 is adapted to deflect a narrow beam of light 10 of elongated rectangular cross-section, the said light emanating from a lamp source 11 illuminating a narrow elongated rectangular slot 12 through a lens 13, the beam from the slot 12 being focussed on the pivoted mirror 9 by a second or collimator lens 14. The beam 10 is adapted to be cut off by a pivoted shutter 15 controlled by a solenoid 16. The beam 10 is deflected, as stated, by the pivoted mirror 9, and passes from the said mirror 9 to a stationary plane mirror 17, which deflects the beam 10 so that it can fall on to a concave mirror 18, and be reflected by the latter on to a single photo-electric cell 19. The said beam 10 is, however, arranged to be interrupted between the mirror 17 and the mirror 18, by a scanning member in the form of a hollow and cylindrical rotatable drum 20. This scanning drum 20 is closed at one end by a wall 21, the other end being completely open, so as to receive the beam 10 and also a bracket 22, the stationary mirror 17 being mounted on the said bracket 22 so as to be disposed at an angle of 45° to the drum axis. The said drum 20 has an annular peripheral wall 23 provided with twelve elongated and rectangular scanning slots 24 (not all of which are shown) which are circumferentially spaced from each other around the drum 20 in the direction of their length, and which are also displaced from each other in the dierction of their width, that is in the direction of the drum axis, so as to be disposed step-wise around the drum 20, the centres of the said scanning slots lying in a spiral curve. The beam 10 is interrupted by the wall 23 of the drum except when a scanning slot 24 lies directly opposite to the mirror 17 and is in the path of the beam; and the drum 20 is driven rapidly at a constant speed by an electric motor 25 which is coupled to a shaft 26 carrying the drum by a belt 27 and pulleys 28, 29. The said shaft 26 is secured to the drum 20 by a boss 30 centrally mounted on the wall 21.

If the pivoted mirror 9 is moved angularly by the plunger 7, the point at which the beam from the mirror 17 meets the slotted wall 23 of the drum 20 moves along the said wall 23 in a direction parallel to the axis of the drum 20, and as the slots 24 are spaced in an axial direction, different positions of the pivoted mirror 9 will result in the beam being passed to the photo-cell 19 through different slots 24. Owing to the stepped arrangement of the slots 24, each slot 24 comes opposite to the mirror 17 at a different time, so that the photo-cell 19 will receive the light beam at different times for different inclinations of the pivoted mirror 9.

When a slot 24 lies in the path of the beam 10, the photo-electric cell 19 receives the beam and is excited thereby, so as to produce a voltage pulse, and this pulse is amplified by an amplifier 31, fed by a power unit A, the amplified pulse then being transmitted to a rotary contact-arm 32 of a rotary switch 33. The rotary-arm 32 is mounted on the shaft 26 carrying the drum 20, so that the arm 32 rotates with the drum 20, and this arm 32 is arranged to sweep over twelve circumferentially-arranged contact studs 34 so as to connect twelve relay devices 35 successively to the amplifier 31 and photo-cell 19 during each revolution of the drum 20. Each relay device 35 is fed by the power unit A and controls a different solenoid 36 for actuating one of the gates 6, there being twelve solenoids 36, one for each gate 6. The timing of the switch device 33 to the drum 20 is such that when the arm 32 engages a particular stud 34, a particular slot 24 of the drum 20 has come directly opposite to the mirror 17; when the arm 32 engages the next stud 34 the next slot 24 has moved opposite to the mirror 17, and so on, each stud 34 corresponding to a particular slot 24. It follows, therefore, that when the beam passes through a particular slot 24 in the drum 20, the resulting amplified voltage pulse is directed by the rotary arm 32 to the relay device 35 connected to the particular stud 34 which corresponds to that slot 24. Thus, different angular positions of the mirror 9 will cause different relays 35 to operate, and will therefore cause different gates 6 to open.

Figures 5, 6:
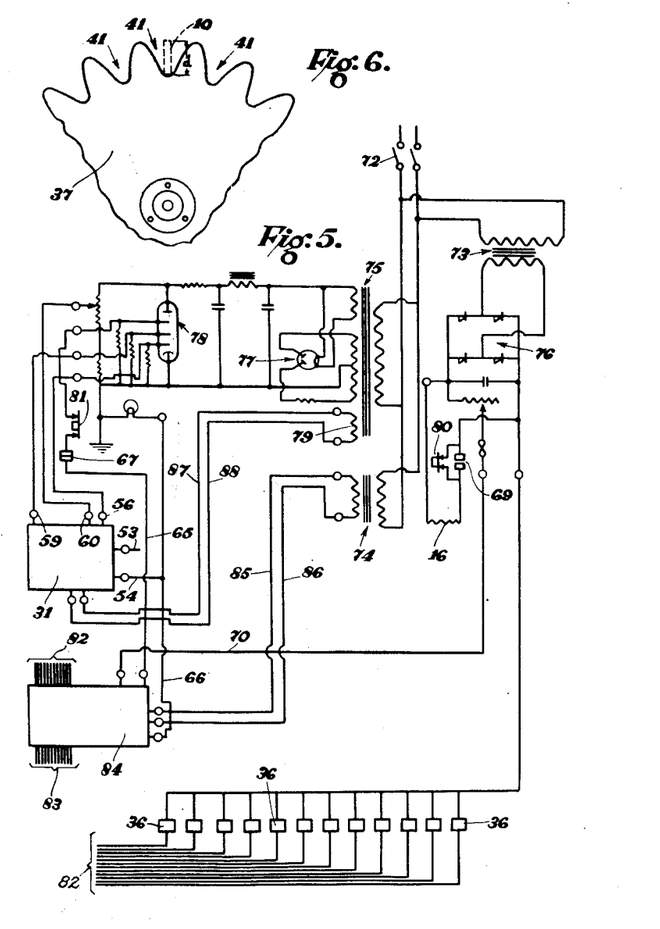
Figure 5 shows the power supply circuits for the amplifier, relay devices, and solenoids shown in Figures 3 and 4.
Figure 6 is a fragmentary face view of a rotatable modulator disc placed in the path of the light beam in the said grading apparatus.

Interposed between the pivoted mirror 9 and the stationary mirror 17 is a rotatable disc 37 mounted so as to be co-axial with the scanning drum 20 and adapted to be driven by the motor 25 through a belt 38 and pulleys 39, 40. This disc 37, a part of which is shown in face view in Figure 6, is formed with peripherally-spaced notches 41 which have their edges of a sine wave form in shape and through which the light beam 10 can pass, and the said disc 37 serves to modulate the light beam 10 so that the depth (indicated by $d$) of the beam 10, and therefore the area of cross-section of the beam 10, varies in the sine wave manner. Each electrical pulse from the photo-electric cell 19, caused by the beam 10 exciting the latter each time the beam passes through a slot 24, comprises a short burst of current at a voltage which varies in a sine wave manner owing to the aforesaid variation in the cross-sectional area of the beam, and thus enables the amplifier 31 to be of an alternating-current type. The use of a direct-current amplifier, which may give rise to disadvantages such as long-term drift and instability, is, therefore, avoided by the provision of the aforesaid modulator discs 37. The amplifier is designed to function at the frequency determined by the speed of rotation of the discs 37 and by the number of notches 41 therein.

The beam of light 10 is focussed by the optical system so as to form a sharp elongated rectangular image of the slit 12 on the inside face of the wall 23 of the drum 20, the width of this image being arranged to be one-half the width of a scanning slot 24. For many angular positions of the beam 10 the latter will pass through one slot 24 only, but the said beam 10 will in some positions be passed, in unequal amounts, by two adjacent slots 24 (as shown for example in Figure 2, wherein $a$ and $b$ denote two adjacent slots 24, and $c$ indicates a position, viewed in cross-section, of the beam 10), and in order to prevent an impulse from being passed in such cases to the relay 35 corresponding to the slot passing the lesser amount of light, the amplifier 31 incorporates a stage having a valve the control grid of which is negatively biased to a voltage below its cut-off voltage by an amount slightly less than that produced when the area of cross-section of the beam 10 falling on the cell 19 is 50% of the area of one slot 24. Thus, in the arrangement represented in Figure 2, the slot $b$ can pass more of the beam $c$ than can the slot $a$, so that only the relay corresponding to slot $b$ will receive an impulse from the photo-electric cell 19. If, on the other hand, the beam 10 is in such a position as to be passed in exactly equal amounts by two adjacent slots 24, two relays will receive impulses, but the relays are arranged, as will be hereinafter explained, so that only the first of the two relays to receive an impulse will operate in such a case.

Figure 3:
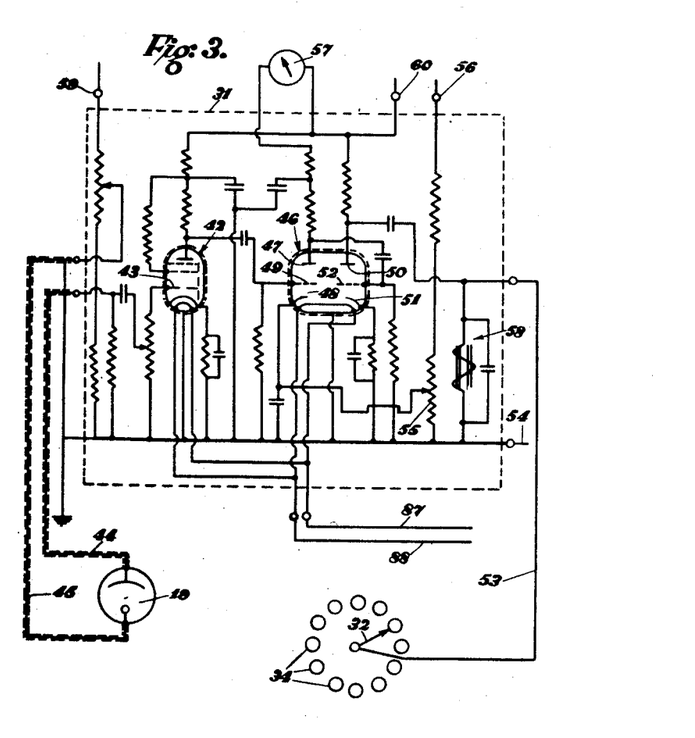
Figure 3 shows the circuit diagram of an amplifier connected between a photo-electric cell and a movable switch device of the said grading apparatus.

The internal circuit of the amplifier 31 is shown in Figure 3, the said amplifier having three stages, with resistance-capacity coupling between stages. The first stage of the amplifier 31 comprises a pentode valve 42 having a control grid 43 to which the voltage impulse from the photo-electric cell 19 is applied, the said cell 19 being connected to the amplifier through screened leads 44, 45. The second and third stages of the amplifier are served by a double-triode valve 46 having electrodes 47—52, anode 47, cathode 48, and grid 49 being in the second stage, and anode 50, cathode 51 and grid 52 being in the third stage. The amplified pulse is applied to the relay devices through leads 53, 54, of which lead 53 is connected to the brush arm 32, lead 54 serving also as a common negative lead of the amplifier.

The grid 49 of the valve 46 constitutes, in the arrangement shown, the hereinbefore-mentioned grid which is negatively biased to a voltage below its cut-off point, and this negative bias is obtained and controlled by a variable resistance 55 in the circuit of the cathode 48 associated with the said grid 49, an external voltage being applied to the said bias resistance 55 through a terminal 56. Adjustment of the value of the negative bias voltage is facilitated by a milliammeter 57.

A tuned filter 58 is provided in the output side of the amplifier, the said filter serving to reduce interference and being tuned to suit the frequency of the voltage pulse, as determined by the modulator disc 37. The external voltage for working the cell 19 is applied through a terminal 59, and the anode voltage for the amplifier is applied through a terminal 60. Suitable voltages are 70 volts at terminal 56, 140 volts at terminal 59, and 280 volts at terminal 60.

Figure 4:
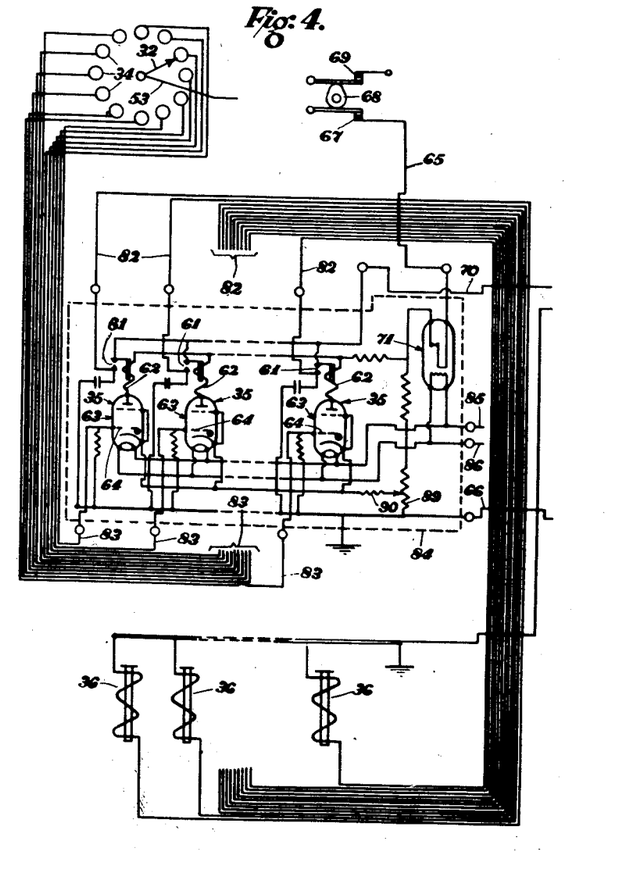
Figure 4 represents the circuit diagram of relay devices which are connected to the said movable switch and which control solenoids for actuating gates provided in the apparatus, twelve relay devices in all being provided, one corresponding to each stud of the switch device, but only three being shown in the figure, those omitted being however, arranged similarly to each of the three shown.

The internal circuits of the relay devices 35 are indicated in Figure 4. Each relay device 35 comprises an electromagnetic relay switch 61 connected by a lead 82 to the corresponding solenoid 36, the switch 61 being in series with its solenoid, and in order that this switch 61 may be operated by a short voltage pulse from the amplifier 31 when the rotary switch arm 32 is in the appropriate position, the control coil, shown at 62, of the switch is in series with a gas-filled tetrode valve or thyratron 63, the said pulse being applied, through the arm 32 of the switch 33 to the appropriate stud 34, and thence through a lead 83 to the control grid shown at 64, of the said valve 63. There are twelve gas-filled valves or thyratrons 63 in all, one for each solenoid 36, and a common external voltage of (for example) 210 volts is applied to the valves 63 through leads 65, 66. If, therefore, the valve 63 of a particular relay device 35 receives the voltage impulse from the cell 19 upon its grid 64, the said valve 63 can fire so as to close the circuit of the series coil 62 with a trigger action, thus operating the switch 61 controlling the particular solenoid 36 corresponding to the relay device 35. The switch 61, once closed by the coil 62, will remain closed until the circuit supplying the coil 62 is re-opened by opening contacts 67 in the supply lead 65.

The contacts 67 are automatically actuated by a cam 68 rotating in synchronism with the movement of the feed bar 3, the said cam 68 also serving to actuate contacts 69 controlling the solenoid 16 for the shutter 15. The twelve relay devices 35 are conveniently housed in a single casing 84; and the feed for the solenoids 36 is led in through a lead 70. The valves or thyratrons 63 are connected to the lead 65 through a time delay tube 71 for keeping the said valves 63 initially inoperative until their filaments are sufficiently hot. The relays are arranged (as hereinbefore mentioned) so that if two relays each receive an impulse from the photo-electric cell 19, due to the beam 10 passing in exactly equal amounts through two adjacent slots, only the first of the relays to receive a pulse will operate, and for this purpose the cathodes of all the gas-filled valves or thyratrons 63 are biased by means of a common potentiometer resistance 89 acting as a standing bias, and a common series resistance 90 acting as an automatic bias. The value of the series resistance 90 is chosen so that when one of the valves or thyratrons 63 fires, so that the resistance 90 passes current, the voltage drop through the said resistance 90 is sufficient to prevent further valves or thyratrons 63 from firing until the contacts 67 have been first opened by the cam 68, to switch off the valve or thyratron 63 which is in operation and to remove the voltage drop in the resistance 90, and then closed again. Thus, only one relay can operate during each revolution of the cam 68.

In the operation of the apparatus, the circuits are switched on and the drum 20, disc 37, and feed bar 3 are set in motion. As the first gudgeon-pin 2 to be graded is pushed by the feed bar 3 up to the plunger 7, the cam 68 closes the contacts 69 to cause the solenoid 16 to open the shutter 15, so that the beam 10 falls on the mirror 9. When the gudgeon-pin 2 is beneath the plunger 7, the said mirror 9 is moved angularly by the said plunger 7 to a greater or less extent, according to the diameter of the gudgeon-pin, and the appropriate gate 6 is opened by a solenoid 36 through the action of the relay 35 corresponding to the slot 24 through which the beam, or most of the beam, passes. The gudgeon-pin 2 is then pushed down the guide channel 4 by the feed bar 3 and falls into the appropriate chute 5, the cam 68 meanwhile causing the contacts 69 to open, so that the shutter 15 closes. When the gudgeon-pin is in its chute 5, the cam 68 opens the switch 67, so that the relay device 35 for the said chute no longer operates and the corresponding gate 6 closes, the apparatus then being ready for a further cycle of operation. Each relay device 35, and therefore each chute 5, corresponds to a particular range of angles of deflection of the beam 10 at the mirror 9, the apparatus sharply discriminating between the different ranges of angles, and thus between the different grades of gudgeon-pin diameter.

In the arrangement above described, no reaction or feedback from the gate-operating mechanism and relay devices to the measuring element 7 is possible; and the accuracy and sensitivity of the apparatus does not have to be restricted in any way to meet requirements of mechanical strength, or to enable mechanical power to be transmitted through the apparatus, as would be the case if, for example, the element 7 operated the gate mechanism merely by mechanical coupling means.

The accuracy of measurement is determined only by the characteristics of the optical system, and the electronic circuits are used as a servo or relay system to make any desired amount of mechanical power available to operate the gates 6.

It will be observed that in the above-described apparatus only a single photo-electric cell and a single amplifier are necessary.

The amplifier and relay systems may be of any other suitable form, provided that they enable the impulses from the cell 19 to cause operation of the required gate 6, so that the gudgeon-pin being graded may enter the desired chute 5.

Figure 5 shows a suitable arrangement of the power supply circuits for the amplifier, solenoids, and relay devices of the machine above described. The mains supply is connected through a switch 72 to various transformers 73—75. Transformer 73 steps down the supply voltage to the solenoids 36, a rectifier 76 being connected in circuit with the said solenoid, as shown. Transformer 74 steps down the voltage supplied, through leads 85, 86, to the heating filaments of the gas-filled valves or thyratrons. Transformer 75 supplies the terminals 56, 59, 60, of the amplifier 31, and also the lead 65 serving the valves or thyratrons of the relay devices, through a rectifier 77 and a stabiliser valve 78; and a low-voltage winding 79 of the said transformer serves leads 87, 88, feeding the filaments of the amplifier valves. The solenoid 16, for operating the shutter 15, is connected across the rectified supply for the gate-actuating solenoids 36, as shown, and the circuit of the solenoid 16 contains, in shunt with the contacts 69, a normally-open push-button 80. A similar, but normally closed, push-button 81 is connected in series with the contacts 67 in the lead 65. These buttons 80, 81, give non-automatic control of the shutter 15, and of the anode circuits of the gas-filled valves or thyratrons 63, respectively, and can be used when setting and adjusting the machine.

Setting of the machine is also facilitated by a scale 91 upon which the beam deflection can be read.

Figures 7, 8:
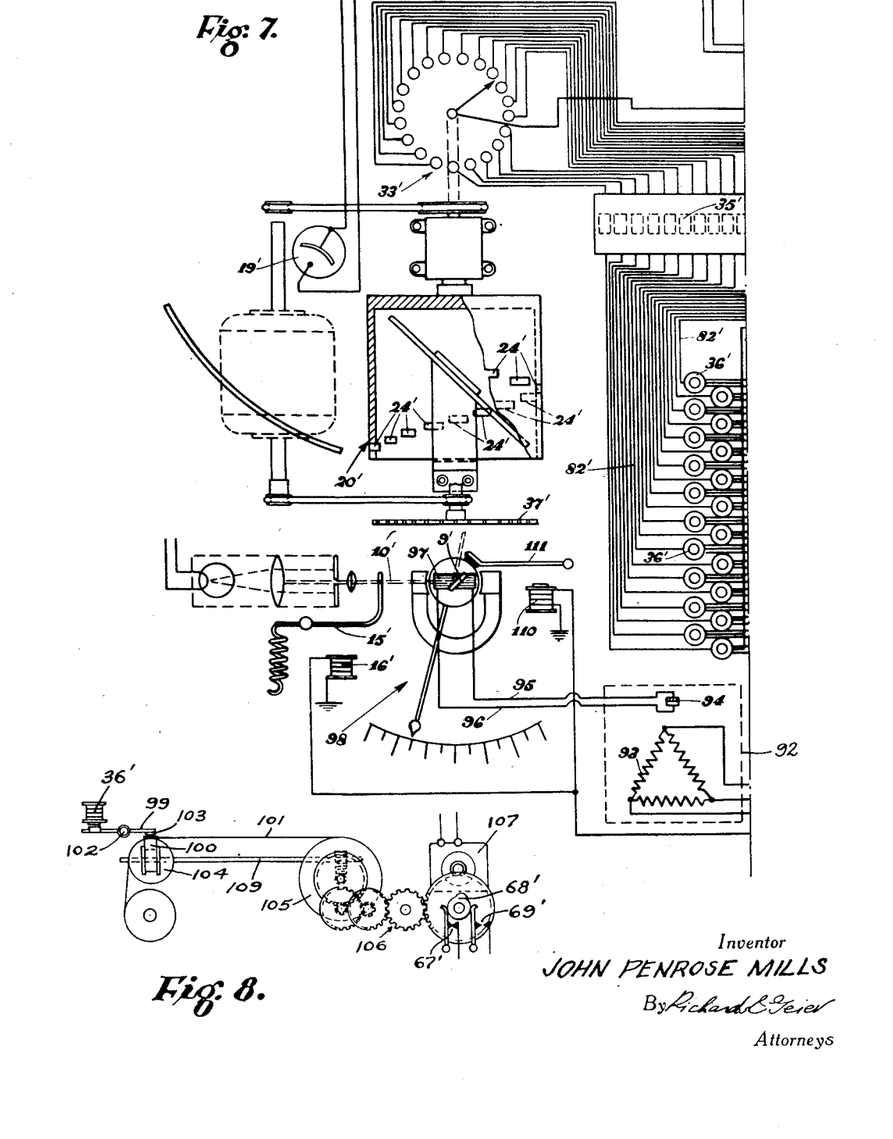
Figure 7 represents another application of the invention, and shows diagrammatically apparatus for automatically recording furnace temperatures upon a movable tape.
Figure 8 is a diagrammatic side view of the said tape and associated parts.
Figure 7A:
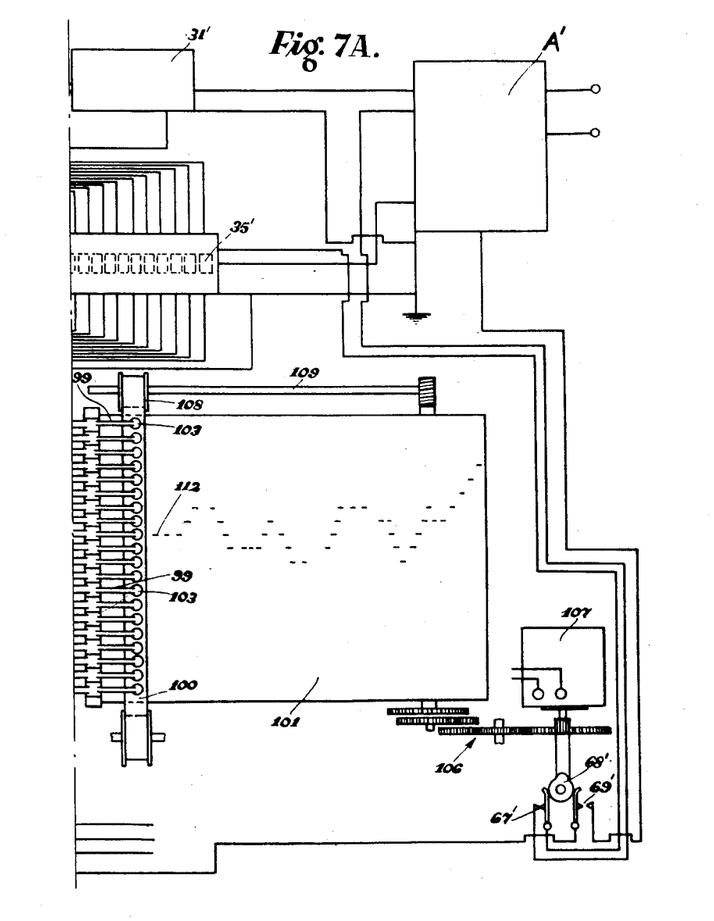

Figures 7 and 8 show the application of the invention to apparatus for recording furnace temperatures upon a moving tape. The furnace, shown at 92 in Figure 7, is of any suitable type and may be electrically heated, for example, by a delta winding 93. A thermo-couple 94 is disposed inside the furnace and is connected by leads 95, 96, to the moving coil, shown at 97, of a moving coil galvanometer 98. Mounted so as to turn with the moving coil 97 of the galvanometer is a plane mirror 9' forming part of an electro-optical system which is arranged similarly to that hereinbefore described in connection with Figures 1 to 6, and in which a light beam 10' is deflected by the mirror 9' past a modulator disc 37' and into a rotating scanning drum 20' provided with scanning slots 24', the beam 10' being caused by the scanning drum 20' to fall on and excite a photo-electric cell 19' at different times for different beam deflections and the light-induced electrical impulse from the cell 19' being passed through an amplifier 31' (fed by a power unit A') to a rotary switch 33' synchronised with the drum 20', and thence to a selected relay device 35', different relays 35' operating for different deflections of the mirror 9'. The circuits of the amplifier 31' and relay devices 35' are respectively arranged similarly to the circuits shown in Figures 3 and 4, except that in the arrangement shown in Figure 7 twenty, instead of twelve, relay devices are provided, the number of scanning slots in the drum and the number of studs in the rotary switch, being increased to twenty accordingly.

The said relay devices 35' are connected to corresponding solenoids 36' by leads 82', but the said solenoids 36', instead of actuating gates, are arranged to control angularly-movable printing-levers 99 adapted to press on inking-ribbon 100 into engagement with a recording tape or band 101 moving at right angles to the ribbon 100. Twenty levers 99 are provided, one to each solenoid 36', the said levers 99 being pivotally mounted at their middle portions on a common bar 102 (Figure 8) and being arranged so that their printing heads, indicated at 103, are equally spaced along the inking-ribbon 100. The printing-levers 99 normally lie out of contact with, or just touch, the inking-ribbon 100, but when a particular solenoid 36' is energized its corresponding printing-lever 99 is moved angularly to press the adjacent portion of the ribbon 100 into contact with the said tape or band 101, so as to make an ink mark (such as that indicated at 112) thereon.

The tape or band 101, which moves at a constant speed, is supported beneath the ribbon 100 and levers 99 by a roller 104 (Figure 8) and is wound up on a drum 105 driven at a constant speed, through a gear train 106, by a synchronous clock-type motor 107. The inking-ribbon 100 is driven by a roller 108 (Figure 7) on a shaft 109 geared to the shaft of the drum 105. The motor 107 also drives a cam 68' adapted, in a similar manner to the hereinbefore-described cam 68, to actuate switch contacts 67', 69', respectively controlling the feed for the valves of the relay devices 35', and the feed for the solenoid 16' for actuating a shutter 15' in the path of the light beam. A solenoid 110, controlling a brake lever 111 for arresting the moving coil 97, is placed in shunt with the solenoid 16' so that the coil 97, and the mirror 9' are momentarily held steady each time the shutter 15' is opened by the said solenoid 16'.

In operation, the shutter 15' is automatically opened once in each revolution of the cam 68', and each time that the said shutter opens the beam 10' excites the cell 19' and generates an electrical pulse which causes actuation of one or other of the relays 35' controlling the solenoids 36' operating the printing-levers 99, so that a mark is printed on the moving tape or band 101. Since different relays, and thus different printing-levers 99, operate for different deflections of the beam by the mirror 9', and since the degree of inclination of the mirror 9' will depend on the strength of the thermo-electric current in the coil 97, it follows that different levers 99 will be operated if the shutter opens at different temperatures of the furnace 92. The variation in the positions of the marks printed by the levers 99 on the tape or band 101 will thus indicate graphically the temperature variation in the furnace 92.

Any other suitable number of printing-levers may be provided, if desired, instead of the twenty levers shown in Figure 7, the number of scanning slots, switch studs, and relay devices being varied accordingly. The recording band or tape may be arranged and driven in any other suitable manner, or the levers may be arranged to print upon a rotating recording drum, instead of upon a band or tape, if required.

Solenoid-operated pens, which can directly engage the recording tape or band or recording drum, may, if desired, be provided instead of the above-described arrangement of solenoid-operated printing-levers co-operating with an inking ribbon. The arrangement shown in Figures 7 and 8 may be adapted to record pressure variations, instead of temperature variations, by arranging the angularly-movable mirror 9' to be actuated by a suitable pressure-responsive member, instead of by a moving-coil connected to a thermo-couple.

The apparatus shown in Figures 1 to 6 may be adapted so as merely to test the diameters of the gudgeon-pins by arranging for the relays to operate numbered signal lamps or other signal devices instead of controlling solenoids for actuating gates. The operator of the apparatus could then manually select or grade the pins according to the indications given by the signal devices when the pins are placed one by one under the part 7.

Whilst in the embodiments shown a plane mirror 9 or 9' is preferred for deflecting the beam, a movable prism may be substituted for a plane mirror, so as to deflect a beam of monochromatic light.

I claim:

1. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a continuously and cyclically movable scanning device for permitting the passage of the light beam to said photo-electric cell during each cycle, the beam thereby being caused to fall on and excite the cell at different times for different amounts of beam deflection, a continuously-movable switch device electrically connected to said photo-electric cell and driven in synchronism with said scanning device, a plurality of electric circuits electrically connected to said switch device, and a plurality of separate electrically-actuated control devices respectively coupled to said circuits, the said continuously movable switch device being adapted during each cycle electrically to connect the said photo-electric cell to each circiut of said plurality of electric circuits in turn whereby one or other of the said circuits is selectively energized according to the amount of beam deflection.

2. Electro-optical measuring apparatus for selectively bringing into operation one of a plurality of control devices in accordance with variations in physical displacement of a member responsive to variations in physical characteristics, comprising a source of a light beam, an angularly-movable mirror in engagement with said member to be operable by such variations in physical displacement to cause the light beam to deflect in accordance with said variations, a photo-electric cell arranged so that it can be excited by said light beam, a continuously and cyclically movable scanning device for permitting the passage of the light beam to said photo-electric cell during each cycle, the beam thereby being caused to fall on and excite the cell at different times for different amounts of beam deflection, a continuously-movable switch device electrically connected to said photo-electric cell and driven in synchronism with said scanning device, a plurality of electric circuits electrically connected to said switch device, and a plurality of separate electrically-actuated control devices respectively coupled to said circuits, the said continuously-movable switch device being adapted during each cycle electrically to connect the said photo-electric cell to each circuit of said plurality of electric circuits in turn, whereby one or other of the said circuits is selectively energised according to the amount of beam deflection.

3. Electro-optical measuring apparatus for selectively bringing into operation one of a plurality of control devices in accordance with variations in physical displacement of a member responsive to variations in physical characteristics comprising a source of a light beam, means engaged by the member operable by such variations in physical displacement to cause the light beam to deflect in accordance with said variations, a photo-electric cell arranged so that it can be excited by said light beam, a continuously rotatable scanning member which is provided with a plurality of scanning apertures, the said rotatable scanning member permitting the passage of the beam to said photo-electric cell during each cycle of rotation, the beam passing through different scanning apertures for different deflections and thereby being caused to fall on and excite the cell at different times for different deflections, a rotary switch device electrically connected to said photo-electric cell and driven in synchronism with said scanning member, a plurality of electric circuits connected to said rotary switch device, and a plurality of separate electrically-actuated control devices respectively coupled to said circuits, the said rotary switch device being adapted during each cycle of rotation electrically to connect the said photo-electric cell to each circuit of said plurality of circuits in turn, whereby one or other of the said circuits is energized according to the amount of beam deflection.

4. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a continuously rotatable hollow and cylindrical scanning drum which is provided in its annular wall with a plurality of scanning apertures, which are displaced from each other both in a circumferential direction and in a direction parallel to the drum axis, the said rotatable scanning drum having an opening at one end to receive the beam and the drum permitting the passage of the beam to said photo-electric cell during each cycle of rotation, the beam passing through different scanning apertures for different deflections and thereby being caused to fall on and excite the cell at different times for different deflections, a rotary switch device electrically connected to said photo-electric cell and driven in synchronism with said scanning drum, a plurality of electric circuits connected to said rotary switch device, and a plurality of separate electrically-actuated control devices respectively coupled to said circuits, the said rotary switch device being adapted during each cycle of rotation electrically to connect the said photo-electric cell to each circuit of said plurality of circuits in turn, whereby one or other of the said circuits is energized according to the amount of beam deflection.

5. Electro-optical measuring apparatus for selectively bringing into operation one of a plurality of control devices in accordance with variations in physical displacement of a member responsive to variations in physical characteristics, comprising a source of a light beam, an angularly-movable mirror in engagement with said member to be operable by such variations in physical displacement to cause the light beam to deflect in accordance with said variations, a photo-electric cell arranged so that it can be excited by said light beam, a continuously rotatable hollow and cylindrical scanning drum which has an opening at one end to receive the beam and which is provided in its annular wall with a plurality of scanning slots displaced from each other both in a circumferential direction and in a direction parallel to the drum axis, a stationary mirror disposed inside said drum and inclined to the drum axis to deflect the beam to the said slotted annular wall, the drum permitting the passage of the beam to said photo-electric cell during each cycle of rotation and the beam passing through different scanning slots for different deflections, said beam thereby being caused to fall on and excite the cell at different times for different deflections, a continuously-rotatable contact member electrically connected to said photo-electric cell and driven in synchronism with said scanning drum, a plurality of stationary contact parts adapted to be engaged in turn by said rotatable contact member, a plurality of electric circuits connected to said stationary contact parts, different circuits being connected to different contact parts, and a plurality of separate electrically-actuated control devices respectively coupled to said circuits, the said rotatable contact member being adapted during each cycle of rotation electrically to connect the said photo-electric cell to each circuit of said plurality of circuits in turn, whereby one or other of the said circuits is energized according to the amount of beam deflection.

6. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a continuously and cyclically movable scanning member provided with a plurality of scanning apertures and permitting the passage of the light beam to said photo-electric cell during each cycle, the beam passing through different scanning apertures for different deflections and thereby being caused to fall on and excite the cell at different times for different amounts of beam deflection, a continuously-movable switch device driven in synchronism with said scanning member, an amplifier having valves through which said cell is electrically connected to said switch device, a plurality of electric circuits electrically connected to said switch device, a plurality of separate electrically-actuated control devices respectively coupled to said circuits, said switch device being adapted during each cycle to connect said cell to each circuit of said plurality of circuits in turn, whereby one or other of said circuits is energized according to the amount of beam deflection, and means for negatively biasing a control grid of a valve of the amplifier to a voltage below the cut-off voltage for the valve so that the amplifier will not transmit a light-induced voltage from the cell to the switch device if the said voltage is generated by a beam the cross-sectional area of which at a scanning aperture is less than a pre-determined cross-sectional area.

7. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam from said source to deflect in accordance with said variations, a photo-electric cell arranged so that it can be excited by said light beam, a rotatable member interposed in the path of the light beam, said interposed rotatable member having circumferentially-arranged apertures through which the light beam can pass, and which have edges of a sine wave form in shape, so that the voltage of light-induced electrical pulses from the photo-electric cell is varied in a sine wave manner, a continuously and cyclically movable scanning device mounted between the rotatable member and the cell for permitting the passage of the light beam to said cell during each cycle, the beam thereby being caused to fall on and excite the cell at different times for different amounts of beam deflection, a continuously-movable switch device driven in synchronism with said scanning device, an alternating-current type amplifier through which said cell is electrically connected to said switch device, a plurality of electric circuits connected to said switch device, and a plurality of separate electrically-actuated control devices respectively coupled to said circuits, the said continuously-movable switch device being adapted during each cycle electrically to connect the said photo-electric cell to each circuit of said plurality of electric circuits in turn, whereby one or other of the said circuits is energized according to the amount of beam deflection.

8. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a continuously and cyclically movable scanning device for permitting the passage of the light beam to said photo-electric cell during each cycle, the beam thereby being caused to fall on and excite the cell at different times for different amounts of beam deflection, a continuously-movable switch device driven in synchronism with said scanning device, an amplifier through which said cell is electrically connected to said switch device, a plurality of relay devices electrically connected to said switch device, a plurality of separate solenoids each electrically coupled to and operated by a different one of said relay devices, and a gas-filled triggering valve in each relay device, the said continuously-movable switch device being adapted during each cycle electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause operation of the respective solenoid.

9. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a continuously and cyclically movable scanning device for permitting the passage of the light beam to said photo-electric cell during each cycle, the beam thereby being caused to fall on and excite the cell at different times for different amounts of beam deflection, a continuously-movable switch device driven in synchronism with said scanning device, an amplifier through which said cell is electrically connected to said switch device, a plurality of relay devices electrically connected to said switch device, a plurality of separate solenoids each electrically coupled to and operated by a different one of said relay devices, a gas-filled triggering valve in each relay device, a driven rotating cam, and a switch in the supply circuit to the plates of the triggering valves actuated by said cam, the continuously-movable switch device in synchronism with the scanning device being adapted during each cycle electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause operation of the respective solenoid, and the cam-actuated switch being arranged to cause automatic de-energizing of said solenoid after it has been operated by its relay device.

10. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a rotatable member interposed in the path of the light beam, said interposed member having circumferentially-arranged apertures through which the light beam can pass, and which have edges of a sine wave form in shape, so that the voltage of light induced electrical pulses from the photo-electric cell is varied in a sine wave manner, a continuously and cyclically movable scanning device mounted between the rotatable member and the cell for permitting the passage of the light beam to said cell during each cycle, the beam thereby being caused to fall on and excite the cell at different times for different amounts of beam deflection, a continuously-movable switch device driven in synchronism with said scanning device, an alternating current type amplifier through which said cell is electrically connected to said switch device, a plurality of relay devices electrically connected to said switch device, a plurality of separate solenoids each electrically coupled to and operated by a different one of said relay devices, and a gas-filled triggering valve in each relay device, the said continuously-movable switch device being adapted during each cycle electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause operation of the respective solenoid.

11. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a rotatable member interposed in the path of the light beam, said interposed member having circumferentially-arranged apertures through which the light beam can pass, and which have edges of a sine wave form in shape, so that the voltage of the light induced electrical pulses from the photo-electric cell is varied in a sine wave manner, a continuously and cyclically movable scanning member mounted between the rotatable member and the cell provided with a plurality of scanning apertures and permitting the passage of the light beam to said cell during each cycle, the beam passing through different scanning apertures for different deflections and thereby being caused to fall on and excite the cell at different times for different amounts of beam deflection, a continuously-movable switch device driven in synchronism with said scanning member, an alternating-current type amplifier having valves through which said cell is electrically connected to said switch device, a plurality of electric circuits electrically connected to said switch device, a plurality of separate electrically-actuated control devices respectively coupled to said circuits, said switch device being adapted during each cycle to connect said cell to each circuit of said plurality of circuits in turn, whereby one or other of said circuits is energized according to the amount of beam deflection, and means for negatively biasing a control grid of a valve of the amplifier to a voltage below the cut-off voltage for the valve so that the amplifier will not transmit a light-induced voltage from the cell to the switch device if the said voltage is generated by a beam the cross-sectional area of which at a scanning aperture is less than a pre-determined cross-sectional area.

12. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a rotatable member interposed in the path of the light beam, said interposed member having circumferentially-arranged apertures through which the light beam can pass, and which have edges of a sine wave form in shape, so that the voltage of light-induced electrical pulses from the photo-electric cell is varied in a sine wave manner, a continuously and cyclically movable scanning member mouted between the rotatable member and the call provided with a plurality of scanning apertures and permitting the passage of the light beam to said cell during each cycle, the beam passing through different scanning apertures for different deflections and thereby being caused to fall on and excite the cell at different times for different amounts of beam deflection, a continuously-movable switch device driven in synchronism with said scanning member, an alternating-current type amplifier having valves thruogh said cell is electrically connected to said switch device, a plurality of relay devices electrically connected to said switch device, a plurality of separate solenoids each electrically coupled to and operated by a different one of said relay devices, a gas-filled triggering valve in each relay device, the said continuously movable switch device being adapted during each cycle electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause operation of the respective solenoid, and means for negatively biasing a control grid of a valve of the amplifier to a voltage below the cut-off voltage for the valve so that the amplifier will not transmit a light-induced voltage from the cell to the switch device if the said voltage is generated by a beam the cross-sectional area of which at a scanning aperture is less than a pre-determined cross-sectional area.

13. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a rotatable member interposed in the path of the light beam, said interposed member having circumferentially arranged apertures through which the light beam can pass, and which have edges of a sine wave form in shape, so that the voltage of light-induced electrical pulses from the photo-electric cell is varied in a sine wave manner, a continuously and cyclically movable scanning member mounted between the rotatable member and the cell provided with a plurality of scanning apertures and permitting the passage of the light beam to said cell during each cycle, the beam passing through different scanning apertures for different deflections and thereby being caused to fall on and excite the cell at different times for different amounts of beam deflection, a continuously-movable switch device driven in synchronism with said scanning member, an alternating-current type amplifier having valves through which said cell is electrically connected to said switch device, a plurality of relay devices electrically connected to said switch device, a plurality of separate solenoids each electrically coupled to and operated by a different one of said relay devices, a gas-filled triggering valve in each relay device, a driven rotating cam, a switch in the supply circuit to the plates of the triggering valves actuated by said cam, the continuously-movable switch device in synchronism with the scanning member being adapted during each cycle to connect said photo-electric cell to the triggering valve of each relay device in turn, whereby one or other of said triggering valves, according to the amount of beam deflection, is fired by a light-induced voltage pulse transmitted from the cell, said triggering valve when fired initiating operation of the respective relay device to cause operation of the respective solenoid, and said cam-actuated switch being arranged to cause automatic de-energizing of said solenoid after it has been operated by its relay device, and means for negatively biasing a control grid of a valve of the amplifier to a voltage below the cut-off voltage for the valve so that the amplifier will not transmit a light-induced voltage from the cell to the switch device in synchronism with the scanning member if the said voltage is generated by a beam the cross-sectional area of which at a scanning aperture is less than a pre-determined cross-sectional area.

14. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with said variations, a photo-electric cell arranged so that it can be excited by said light beam, a rotatable member interposed in the path of the light beam, said interposed member having circumferentially-arranged apertures through which the light beam can pass, and which have edges of a sine wave form in shape, so that the voltage of light induced electrical pulses from the photo-electric cell is varied in a sine wave manner, a continuously rotatable hollow and cylindrical scanning drum mounted between the rotatable member and the cell which is provided in its annular wall with a plurality of scanning apertures which are displaced from each other both in a circumferential direction and in a direction parallel to the drum axis, the said rotatable scanning drum having an opening at one end to receive the beam and the drum permitting the passage of the beam to said photo-electric cell during each cycle of rotation, the beam passing through different scanning apertures for different deflections and thereby being caused to fall on and excite the cell at different times for different deflections, a continuously-movable rotary switch device driven in synchronism with said scanning drum, an alternating-current type amplifier through which said cell is electrically connected to said switch device, a plurality of relay devices electrically connected to said switch device, a plurality of separate solenoids each electrically coupled to and operated by a different one of said relay devices, a gas-filled triggering valve in each relay device, the continuously-movable rotary switch device being adapted during each cycle of rotation to connect the said photo-electric cell to the triggering valve of each relay device in turn, whereby one or other of said triggering devices, according to the amount of beam deflection, is fired by a light-induced voltage pulse transmitted from the cell, said triggering valve when fired initiating operation of the respective relay device to cause operation of the respective solenoid, and means for negatively biasing a control grid of a valve of the amplifier to a voltage below the cut-off voltage for the valve so that the amplifier will not transmit a light-induced voltage from the cell to the rotary switch device if the said voltage is generated by a beam the cross-sectional area of which at a scanning aperture is less than a pre-determined cross-sectional area.

15. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with such variations, a photoelectric cell arranged so that it can be excited by said light beam, a rotatable member interposed in the path of the light beam, said interposed member having circumferentially arranged apertures through which the light beam can pass, and which have edges of a sine waveform in shape, so that the voltage of light-induced electrical pulses from the photoelectric cell is varied in a sine wave manner, a continuously rotatable hollow and cylindrical scanning drum mounted between the rotatable member and the cell which is provided in its annular wall with a plurality of scanning apertures which are displaced from each other both in a circumferential direction and in a direction parallel to the drum axis, the said rotatable scanning drum having an opening at one end to receive the beam and the drum permitting the passage of the beam to said photoelectric cell during each cycle of rotation, the beam passing through different scanning apertures for different deflections and thereby being caused to fall on and excite the cell at different times for different deflections, a continuously movable rotary switch device driven in synchronism with said scanning drum, an alternating-current type amplifier through which said cell is electrically connected to said switch device, a plurality of relay devices electrically connected to said switch device, a plurality of separate solenoids each electrically coupled to and operated by a different one of said relay devices, a gas-filled triggering valve in each relay device, a driven rotating cam, a switch in the supply circuit to the plates of the triggering valves actuated by said cam, the continuously movable rotary switch device in synchronism with the scanning drum being adapted during each cycle of rotation to connect said photo-electric cell to the triggering valve of each relay device in turn, whereby one or other of said triggering valves, according to the amount of beam deflection is fired by a light induced voltage pulse transmitted from the cell, said triggering valve when fired initiating operation of the respective relay device to cause operation of the respective solenoid, and said cam-actuated switch being arranged to cause automatic de-energising of said solenoid after it has been operated by its relay device, and means for negatively biasing a control grid of a valve of the amplifier to a voltage below the cut-off voltage for the valve so that the amplifier will not transmit a light-induced voltage from the cell to the rotary switch device in synchronism with the scanning drum if the said voltage is generated by a beam the cross-sectional area of which at a scanning aperture is less than a predetermined cross-sectional area.

16. Electro-optical measuring apparatus for selectively bringing into operation one of a plurality of control devices in accordance with variations in physical displacement of a member responsive to variations in physical characteristics, comprising a source of a light beam, means engaged by the member operable by such variations in physical displacement to cause the light beam to deflect in accordance with such variations, a photoelectric cell arranged so that it can be excited by said light beam, a continuously rotatable scanning member provided with a plurality of scanning apertures, said scanning member permitting the passage of the beam to said photoelectric cell during each cycle of rotation, the beam passing through different scanning apertures for different deflections and thereby being caused to fall on and excite the cell at different times for different deflections, a continuously movable rotary switch device driven in synchronism with said scanning member, an amplifier through which said cell is electrically connected to said rotary switch device, a plurality of relay devices electrically connected to said switch device, a plurality of separate solenoids each electrically coupled to and operated by a different one of said relay devices, a gas-filled triggering valve in each relay device, the rotary switch device being adapted during each cycle of rotation to connect said photoelectric cell to the triggering valve of each relay device in turn, whereby one or other of said triggering valves, according to the amount of beam deflection, is fired by a light-induced voltage pulse transmitted from the cell, said triggering valve when fired initiating operation of the respective relay device to cause operation of the respective solenoid, and means for negatively biasing a control grid of a valve of the amplifier to a voltage below the cut-off voltage for the valve so that the amplifier will not transmit a light-induced voltage from the cell to the rotary switch device if the said voltage is generated by a beam the cross-sectional area of which at a scanning aperture is less than a predetermined cross-sectional area.

17. Apparatus for grading articles according to variations in a dimension of the said articles, comprising a source of a light beam, a movable gauge element which can be displaced by the article to be graded to an extent depending on the size of the dimension being measured, means operable by the gauge element to cause a light beam to deflect in accordance with the movement of said gauge element, a photo-electric cell arranged so that it can be excited by said light beam, a continuously-rotatable scanning member for permitting the passage of the light beam to said photo-electric cell during each cycle of rotation, the beam thereby being caused to fall on and excite the cell at different times for different amounts of beam deflection, a continuously-movable rotary switch device driven in synchronism with said scanning member, an amplifier through which said cell is electrically connected to said switch device, a plurality of relay devices electrically connected to said switch device, a gas-filled triggering valve in each relay device, a plurality of separate solenoids each electrically coupled to and operated by a different one of said relay devices, a plurality of grading stations for receiving articles being graded, means for causing said articles to move beyond the gauge element to said grading stations, a plurality of article-diverting elements each actuated by a different one of said relay-operated solenoids, each article-diverting element controlling the entrance of an article being graded to a different one of said grading stations, a driven rotating cam, and a switch in the supply circuit to the plates of the triggering valves actuated by said cam, the aforesaid rotary switch device in synchronism with the scanning member being adapted during each cycle of rotation electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause the respective article-diverting element to be operated by its solenoid, and the cam-actuated switch being arranged to cause automatic de-energising of said solenoid after it has been operated by its relay device.

18. Electro-optical measuring apparatus, comprising a member physically displaceable in response to variations in a physical characteristic being measured, a source of a light beam, means operable by variations in the physical displacement of said member to cause a light beam to deflect in accordance with said variations, a photo-electric cell arranged so that it can be excited by said light beam, a continuously rotatable scanning member for permitting the passage of the light beam to said photo-electric cell during each cycle of rotation, the beam thereby being caused to fall on and excite the cell at different times for different amounts of beam deflection, a continuously-movable rotary switch device driven in synchronism with said scanning member, an amplifier through which said cell is electrically connected to said switch device, a plurality of relay devices electrically connected to said switch device, a gas-filled triggering valve in each relay device, a plurality of separate solenoids each electrically coupled to and operated by a different one of said relay devices, a moving recording member, a plurality of marking devices co-operating with said recording member and each actuated by a different one of said solenoids, a driven rotating cam, and a switch in the supply circuit to the plates of the triggering valves actuated by said cam, the aforesaid rotary switch device in synchronism with the scanning member being adapted during each cycle of rotation electrically to connect the said photo-electric cell to the triggering valve of each relay device in turn, whereby one or other of the said triggering valves, according to the amount of beam deflection, is fired by a light-induced voltage pulse transmitted from the cell, said triggering valve when fired initiating operation of the respective relay device to cause the respective marking device to be operated by its solenoid, and the cam-actuated switch being arranged to cause automatic de-energising of said solenoid after it has been operated by its relay device.

References Cited in the file of this patent

UNITED STATES PATENTS

| | | |
|---|---|---|
| 1,933,650 | Bascom | Nov. 7, 1933 |
| 1,966,354 | Noxon | July 10, 1934 |
| 2,370,160 | Hansell | Feb. 27, 1945 |
| 2,504,505 | De Tar | Apr. 18, 1950 |
| 2,663,758 | Shepard | Dec. 22, 1953 |